United States Patent
Friedman

(10) Patent No.: US 9,519,666 B2
(45) Date of Patent: Dec. 13, 2016

(54) SNAPSHOTS AND THIN-PROVISIONING IN DISTRIBUTED STORAGE OVER SHARED STORAGE DEVICES

(71) Applicant: E8 STORAGE SYSTEMS LTD., Ramat Gan (IL)

(72) Inventor: Alex Friedman, Hadera (IL)

(73) Assignee: E8 STORAGE SYSTEMS LTD., Ramat Gan (IL)

( * ) Notice: Subject to any disclaimer, the term of this patent is extended or adjusted under 35 U.S.C. 154(b) by 0 days.

(21) Appl. No.: 14/697,653

(22) Filed: Apr. 28, 2015

(65) Prior Publication Data

US 2016/0154834 A1 Jun. 2, 2016

Related U.S. Application Data

(60) Provisional application No. 62/085,273, filed on Nov. 27, 2014.

(51) Int. Cl.
  *G06F 17/30* (2006.01)

(52) U.S. Cl.
  CPC ..... *G06F 17/30327* (2013.01); *G06F 17/3007* (2013.01); *G06F 17/30091* (2013.01); *G06F 17/30283* (2013.01); *G06F 17/30864* (2013.01); *G06F 17/30917* (2013.01)

(58) Field of Classification Search
  CPC .............. G06F 9/30043; G06F 9/30072; G06F 17/30339
  USPC .................................................. 707/705–780
  See application file for complete search history.

(56) References Cited

U.S. PATENT DOCUMENTS

| | | | |
|---|---|---|---|
| 6,446,220 B1 | 9/2002 | Menon | |
| 8,095,763 B2 | 1/2012 | Piszczek et al. | |
| 8,510,265 B1 * | 8/2013 | Boone | G06F 17/302 707/609 |
| 8,595,385 B1 | 11/2013 | Shapiro et al. | |
| 8,725,934 B2 * | 5/2014 | Batwara | G06F 12/0246 711/103 |
| 8,812,450 B1 * | 8/2014 | Kesavan et al. | 707/656 |
| 9,164,689 B2 | 10/2015 | O'Brien et al. | |
| 9,251,052 B2 * | 2/2016 | Talagala | G06F 12/0866 |
| 9,285,995 B2 * | 3/2016 | Malwankar | G06F 3/0611 |
| 2003/0028725 A1 | 2/2003 | Naberhuis et al. | |
| 2004/0153576 A1 | 8/2004 | Hansmann et al. | |
| 2005/0050273 A1 | 3/2005 | Horn et al. | |
| 2006/0031450 A1 | 2/2006 | Unrau et al. | |
| 2007/0168396 A1 | 7/2007 | Adams et al. | |

(Continued)

FOREIGN PATENT DOCUMENTS

WO 2013024485 A2 2/2013

OTHER PUBLICATIONS

Rodeh, O., "B-trees, Shadowing, and Clones", ACM Transactions on Storage, vol. 3, No. 4, article 15, 27 pages, Feb. 2008.

(Continued)

*Primary Examiner* — Michelle Owyang
(74) *Attorney, Agent, or Firm* — D. Kligler IP Services Ltd.

(57) ABSTRACT

A method for data storage includes, in a system that includes one or more storage controllers, one or more servers and one or more storage devices, defining one or more data structures that represent thinly-provisioned user volumes used by the servers in storing data on the storage devices. One or more of the data structures are shared among the storage controllers and the servers. One or more of the user volumes are accessed by the servers, using the shared data structures and without executing code on the storage controllers.

28 Claims, 3 Drawing Sheets

(56) References Cited

U.S. PATENT DOCUMENTS

| | | |
|---|---|---|
| 2010/0153617 A1 | 6/2010 | Miroshnichenko et al. |
| 2010/0250831 A1 | 9/2010 | O'Brien et al. |
| 2011/0060887 A1* | 3/2011 | Thatcher ............... G06F 3/0604 711/171 |
| 2011/0246720 A1 | 10/2011 | Nakamura et al. |
| 2011/0296133 A1* | 12/2011 | Flynn .................. G06F 11/1048 711/171 |
| 2012/0079318 A1 | 3/2012 | Colgrove et al. |
| 2012/0144110 A1 | 6/2012 | Smith |
| 2012/0233396 A1 | 9/2012 | Flynn et al. |
| 2013/0046949 A1* | 2/2013 | Colgrove ............. G06F 3/0608 711/170 |
| 2013/0179649 A1* | 7/2013 | Green et al. .................. 711/162 |
| 2013/0198312 A1 | 8/2013 | Tamir et al. |
| 2013/0275447 A1* | 10/2013 | Ben-Tsion ........ G06F 17/30079 707/756 |
| 2014/0040411 A1 | 2/2014 | Weber et al. |
| 2014/0136808 A1 | 5/2014 | Colgrove et al. |
| 2014/0189032 A1* | 7/2014 | Sugimoto et al. ............ 709/212 |
| 2014/0195849 A1 | 7/2014 | Parladori et al. |
| 2014/0289462 A9* | 9/2014 | Malwankar .......... G06F 3/0611 711/114 |
| 2015/0127923 A1* | 5/2015 | Miller et al. .................. 711/206 |
| 2015/0212752 A1 | 7/2015 | Nemazie et al. |
| 2016/0004642 A1* | 1/2016 | Sugimoto ................ G06F 3/06 711/128 |
| 2016/0034418 A1* | 2/2016 | Romem ................ G06F 15/167 709/212 |
| 2016/0162209 A1 | 6/2016 | Calderone |

OTHER PUBLICATIONS

Rodeh, O., "B-trees, Shadowing, and Clones", 2007 Linux Storage & Filesystem Workshop, San Jose, USA, 51 pages, Feb. 12-13, 2007.

Rodeh et al., "BTRFS: The Linux B-Tree Filesystem", ACM Transactions on Storage, vol. 9, No. 3, article 9, 32 pages, Aug. 2013.

Zivan, U.S. Appl. No. 14/599,510 dated Jan. 18, 2015.

Lim et al., "SILT: A memory-efficient, high-performance key-value store", Proceedings of the 23rd ACM Symposium on Operating Systems Principles, 13 pages, year 2011.

Behringer et al., "Memory Management for Concurrent RDMA: A Design for a Key-Value Store", 86 pages, Jun. 3, 2014.

Kalia et al., "Using RDMA Efficiently for Key-Value Services", Proceedings of the 2014 ACM conference on SIGCOMM, 15 pages, Aug. 17-22, 2014.

Mitchell et al., "Using One-Sided RDMA Reads to Build a Fast,CPU-Efficient Key-Value Store", USENIX Annual Technical Conference, pp. 103-114, Jun. 26-28, 2013.

International Application # PCT/IB2015/058842 Search Report dated Feb. 28, 2016.

U.S. Appl. No. 15/015,157 Office Action dated Jun. 8, 2016.

U.S. Appl. No. 14/997,600 Office Action dated Jun. 17, 2016.

U.S. Appl. No. 15/086,102 Office Action dated Jul. 28, 2016.

International Application # PCT/IB2016/051958 Search Report dated Aug. 2, 2016.

\* cited by examiner

SNAPSHOTS AND THIN-PROVISIONING IN DISTRIBUTED STORAGE OVER SHARED STORAGE DEVICES

CROSS-REFERENCE TO RELATED APPLICATIONS

This application claims the benefit of U.S. Provisional Patent Application 62/085,273, filed Nov. 27, 2014, whose disclosure is incorporated herein by reference.

FIELD OF THE INVENTION

The present invention relates generally to data storage, and particularly to methods and systems for distributed storage.

BACKGROUND OF THE INVENTION

Storage systems commonly store data by exposing logical volumes to users. Various algorithms for managing volumes are known in the art. For example, Rodeh describes file-system algorithms based on B-trees, in "B-trees, Shadowing, and Clones," ACM Transactions on Storage, volume 3, no. 4, February, 2008, which is incorporated herein by reference. Rodeh et al. describe a Linux file system based on B-trees, in "BTRFS: The Linux B-Tree Filesystem," ACM Transactions on Storage, volume 9, no. 3, August, 2013, which is incorporated herein by reference.

SUMMARY OF THE INVENTION

An embodiment of the present invention that is described herein provides a method for data storage including, in a system that includes one or more storage controllers, one or more servers and one or more storage devices, defining one or more data structures that represent thinly-provisioned user volumes used by the servers in storing data on the storage devices. One or more of the data structures are shared among the storage controllers and the servers. One or more of the user volumes are accessed by the servers, using the shared data structures and without executing code on the storage controllers.

In some embodiments, sharing the data structures includes sharing one or more tree structures that map logical addresses in the user volumes onto physical addresses in the storage devices. Sharing the data structures may further include sharing a data structure that is indicative of which nodes of the tree structures are referenced by more than a single user volume. In an embodiment, defining the data structures includes defining back-references that point from nodes of the tree structures to the user volumes that access the nodes.

In a disclosed embodiment, accessing the user volumes includes detecting, using the shared data structures, that a given user volume has a clone, and performing a copy-on-write operation when writing to the given user volume. In another embodiment, defining the data structures includes defining back-references that map physical addresses in the storage devices back to logical addresses in the user volumes. In yet another embodiment, defining and sharing the data structures includes updating the shared data structures in response to creation of a clone of a user volume.

In still another embodiment, defining and sharing the data structures includes updating the shared data structures in response to a write to a previously-unallocated address in a user volume.

In an example embodiment, the method includes generating in at least one of the servers a list of commands for updating reference counts associated with one or more of the user volumes, and sending the list to at least one of the storage controllers for background execution. In another embodiment, sharing the data structures includes storing the shared data structures in a memory of the storage controllers, and accessing the shared data structures in the memory of the storage controllers by at least one of the servers using Remote Direct Memory Access (RDMA) operations.

In some embodiments, sharing a given data structure includes caching in a given server a local copy of at least a portion of a shared data structure, and accessing the user volumes includes accessing a given user volume by the given server using the cached local copy. In an embodiment the method includes, upon accessing the local copy, verifying that the local copy is consistent with the shared data structure, and otherwise updating the local copy by accessing the shared data structure stored in the storage controllers. In some embodiments the method includes moving multiple blocks of data from first addresses to second addresses in the storage devices using the shared data structures. Moving the multiple blocks may include performing an XCOPY or an Offloaded Data Transfers (ODX) operation.

There is additionally provided, in accordance with an embodiment of the present invention, a computing system including one or more storage controllers and multiple storage agents. The storage controllers are configured to define one or more data structures that represent thinly-provisioned user volumes used by one or more servers in storing data on one or more storage devices, and to share one or more of the data structures with the servers. The storage agents are configured to run on the respective servers and to access one or more of the user volumes, using the shared data structures and without executing code on the storage controllers.

There is also provided, in accordance with an embodiment of the present invention, a storage controller including a network interface and a processor. The network interface is configured for communicating over a communication network with one or more servers and with one or more storage devices. The processor is configured to define one or more data structures that represent thinly-provisioned user volumes used by the servers in storing data on the storage devices, and to share one or more of the data structures with the servers, so as to enable the servers to access one or more of the user volumes using the shared data structures and without executing code on the storage controllers.

There is further provided, in accordance with an embodiment of the present invention, a server including a network interface and a processor. The network interface is configured for communicating over a communication network with one or more storage devices and with one or more storage controllers. The processor is configured to access, without executing code on the storage controllers, one or more thinly-provisioned user volumes used for storing data in the storage devices, using one or more shared data structures that represent the user volumes and are stored in the storage controllers and shared with the server.

The present invention will be more fully understood from the following detailed description of the embodiments thereof, taken together with the drawings in which:

DETAILED DESCRIPTION OF EMBODIMENTS

Overview

Figure 1:
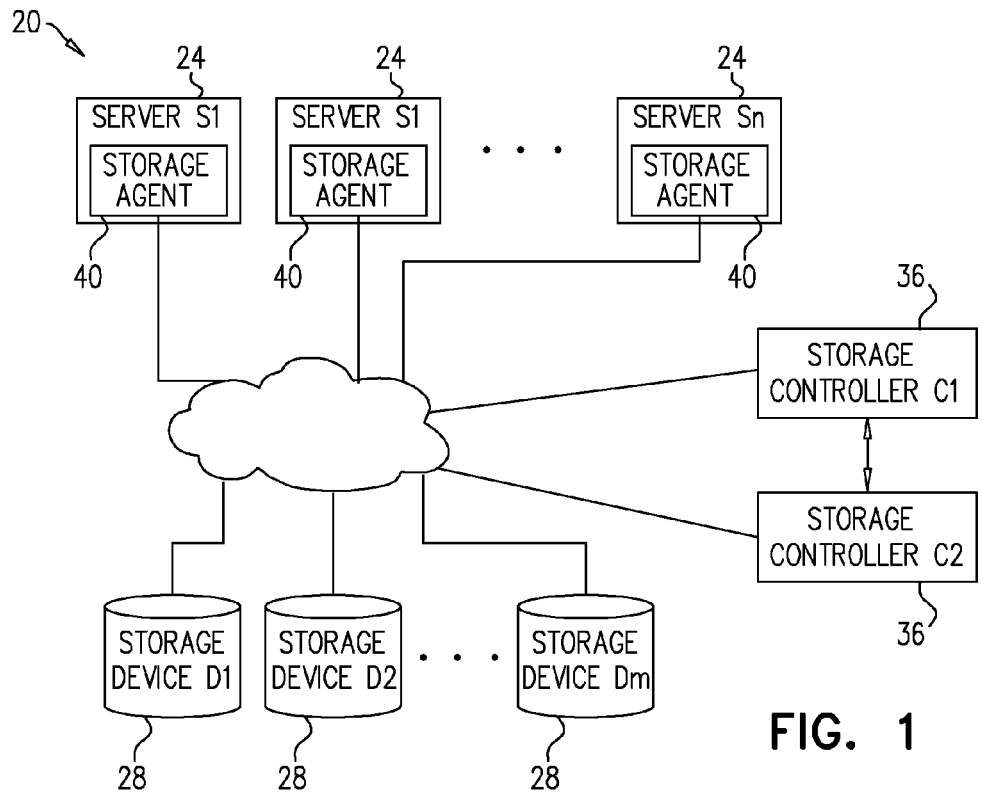
FIG. 1 is a block diagram that schematically illustrates a computing system that uses distributed data storage, in accordance with an embodiment of the present invention.

Embodiments of the present invention that are described herein provide improved methods and systems for managing user volumes in distributed data storage. The techniques described herein can be implemented in any suitable type of computer system. In some embodiments, data storage is carried out using multiple storage agents that are installed on respective servers, multiple storage devices, and one or more storage controllers.

The disclosed system is designed such that the storage controllers are involved in relatively infrequent control-plane operations. Data-path storage commands, e.g., read and write commands, are exchanged directly between the storage agents in the servers and the storage devices. Storage schemes of this sort are described, for example, in U.S. patent application Ser. No. 14/599,510, entitled "Distributed storage over shared multi-queued storage devices," filed Jan. 18, 2015, which is assigned to the assignee of the present patent application and whose disclosure is incorporated herein by reference.

In the disclosed embodiments, the servers store data on the storage devices by accessing thinly-provisioned user volumes. The system may create copies of user volumes, referred to as clones or snapshots. In some embodiments, the thinly-provisioned user volumes are represented using volume trees that map allocated logical addresses onto physical addresses in the storage devices. Nodes in the tree structures may be shared by multiple user volumes, e.g., due to volume cloning.

In some embodiments, the storage controllers define one or more data structures for representing and managing the user volumes, and store the data structures in the storage controllers' memory. One or more of the data structures are shared with the servers, in a manner that allows the servers to perform data-path storage commands directly vis-à-vis the storage devices without running code or otherwise involving the storage controller CPUs.

In an example embodiment, the data structures shared with the servers comprise the volume trees, plus a separate bit-store that indicates which of the volume-tree nodes is used by more than a single user volume. This configuration is highly efficient, because it keeps the size of the shared data structures to a minimum, and still provides the servers with sufficient information to decide when nodes need to be copied-on-write. Other data structures, such as dynasty trees that define parent-child clone relationships between user volumes, and/or various reference counts and back-references, are typically not shared with the servers and are used for relatively infrequent control-plane operations.

Examples of block storage operations that use the shared data structures, such as creation, deletion and cloning of user volumes, and provisioning, insertion and removal of memory extents, are described below. Additional applications of the shared data structures in offloaded data movement operations are also described.

System Description

FIG. 1 is a block diagram that schematically illustrates a computing system 20, in accordance with an embodiment of the present invention. System 20 may comprise, for example, a data center, a High-Performance Computing (HPC) cluster, or any other suitable system. System 20 comprises multiple servers 24 denoted S1 . . . Sn, and multiple storage devices 28 denoted D1 . . . Dm. The servers and storage devices are interconnected by a communication network 32. The system further comprises one or more storage controllers 36 that manage the storage of data in storage devices 28.

Storage-related functions in each server 24 are carried out by a respective storage agent 40. Agents 40 typically comprise software modules installed and running on the respective servers. The functions of agents 40, and their interaction with storage devices 28 and storage controllers 36, are described in detail below.

Servers 24 may comprise any suitable computing platforms that run any suitable applications. In the present context, the term "server" includes both physical servers and virtual servers. For example, a virtual server may be implemented using a Virtual Machine (VM) that is hosted in some physical computer. Thus, in some embodiments multiple virtual servers may run in a single physical computer. Storage controllers 36, too, may be physical or virtual. In an example embodiment, the storage controllers may be implemented as software modules that run on one or more physical servers 24.

Storage devices 28 may comprise any suitable storage medium, such as, for example, Solid State Drives (SSD), Non-Volatile Random Access Memory (NVRAM) devices or Hard Disk Drives (HDDs). In an example embodiment, storage devices 28 comprise multi-queue SSDs that operate in accordance with the NVMe specification. Network 32 may operate in accordance with any suitable communication protocol, such as Ethernet or Infiniband. In some embodiments, some of the disclosed techniques can be implemented using Direct Memory Access (DMA) and/or Remote Direct Memory Access (RDMA) operations.

Generally, system 20 may comprise any suitable number of servers, storage devices and storage controllers. In the present example, the system comprises two storage controllers denoted C1 and C2, for resilience. In this embodiment, one of the storage controllers is defined as primary, while the other controller serves as hot backup and can replace the primary storage controller in case of failure. Alternatively, however, both controllers may be active at the same time, or they may be arranged in any other suitable protected configuration.

In the embodiments described herein, the assumption is that any server 24 is able to communicate with any storage device 28, but there is no need for the servers to communicate with one another. Storage controllers 36 are assumed to be able to communicate with all servers 24 and storage devices 28, as well as with one another.

In some embodiments, although not necessarily, servers 24 are able to access the memories of storage controllers 36 directly using RDMA, e.g., for sharing data structures managed by the storage controllers. Such direct memory access reduces the load on the storage controller CPUs.

The embodiments described herein assume that each storage device 28 provides multiple server-specific queues for storage commands, and has the freedom to queue, schedule and reorder execution of storage commands. In some embodiments, agent 40 in each server 24 maintains a respective queue per storage device, corresponding to the respective server-specific queues of the storage devices. Agents 40 and storage devices 28 are permitted to reorder storage commands in the queues. The queues in a given agent 40 have no visibility outside the context of the respective server.

The configuration of system 20 shown in FIG. 1 is an example configuration, which is chosen purely for the sake of conceptual clarity. In alternative embodiments, any other suitable system configuration can be used. The different system elements may be implemented using suitable hardware, using software, or using a combination of hardware and software elements.

For example, in an alternative embodiment, storage devices 28 may be collocated with storage controllers 36. The storage devices may even be packaged together with the storage controllers in the same mechanical enclosure. Nevertheless, the disclosed techniques enable the servers to access and manipulate user volumes by accessing the storage devices directly, without running code on the storage devices' CPUs.

Each server 24 typically comprises a suitable network interface for communicating over network 32, and a suitable processor that carries out the various server functions. Each storage controller 36 typically comprises a suitable network interface for communicating over network 32, and a suitable processor that carries out the various storage controller functions. In some embodiments, servers 24 and/or storage controllers 36 comprise general-purpose processors, which are programmed in software to carry out the functions described herein. The software may be downloaded to the processors in electronic form, over a network, for example, or it may, alternatively or additionally, be provided and/or stored on non-transitory tangible media, such as magnetic, optical, or electronic memory.

Figure 2:
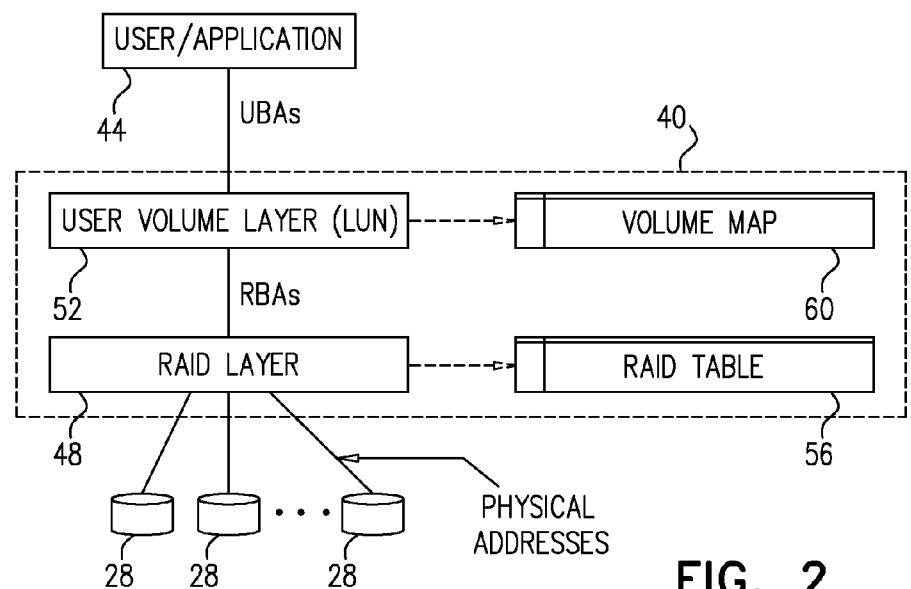
FIG. 2 is a block diagram that schematically illustrates elements of a storage agent, in accordance with an embodiment of the present invention.

FIG. 2 is a block diagram that schematically illustrates elements of storage agent 40, in accordance with an embodiment of the present invention. A respective storage agent of this sort typically runs on each server and performs storage-related functions for user applications 44 running on the server. As noted above, servers 24 may comprise physical and/or virtual servers. Thus, a certain physical computer may run multiple virtual servers 24, each having its own respective storage agent 40.

In the disclosed embodiments, each storage agent 40 comprises a Redundant Array of Independent Disks (RAID) layer 48 and a user-volume layer 52. RAID layer 48 carries out a redundant storage scheme over storage devices 28, including handling storage resiliency, detection of storage device failures, rebuilding of failed storage devices and rebalancing of data in case of maintenance or other evacuation of a storage device. RAID layer 48 also typically stripes data across multiple storage devices 28 for improving storage performance.

In the present example, RAID layer 48 implements a RAID-10 scheme, i.e., replicates and stores two copies of each data item on two different storage devices 28. One of the two copies is defined as primary and the other as secondary. The primary copy is used for readout as long as it is available. If the primary copy is unavailable, for example due to storage-device failure, the RAID layer reverts to read the secondary copy. Alternatively, however, RAID layer 48 may implement any other suitable redundant storage scheme.

RAID layer 48 accesses storage devices 28 using physical addressing. In other words, RAID layer 48 exchanges with storage devices 28 read and write commands, as well as responses and retrieved data, which directly specify physical addresses (physical storage locations) on the storage devices. In this embodiment, all physical-to-logical address translations are performed in agents 40 in the servers, and none in the storage devices.

The RAID layer maps between physical addresses and Logical Volumes (LVs) to be used by user-volume layer 52. Each LV is mapped to two or more physical-address ranges on two or more different storage devices. The two or more ranges are used for storing the replicated copies of the LV data as part of the redundant storage scheme. The addressed used for addressing the LVs (addresses in the contiguous address space exposed by the RAID layer) are referred to herein as RAID Block Addresses (RBAs). An allocated contiguous range in the RBA address space is referred to herein as a block range.

The redundant storage scheme (e.g., RAID) is thus hidden from user-volume layer 52. Layer 52 views the storage medium as a set of guaranteed-storage LVs. User-volume layer 52 is typically unaware of storage device failure, recovery, maintenance and rebuilding, which are handled transparently by RAID layer 48. (Nevertheless, some optimizations may benefit from such awareness by layer 52. For example, there is no need to rebuild unallocated storage space.)

User-volume layer 52 provides storage resources to applications 44 by exposing user volumes that are identified by respective Logical Unit Numbers (LUNs). The addresses used by the servers in addressing the user volumes are referred to herein as User Block Addresses (UBAs). An allocated contiguous range in the UBA address space is referred to as an extent. An extent typically comprises a pointer to a block range. The terms "user volume," "LUN" and "UBA" are used interchangeably herein. In other words, a user application 44 views the storage system as a collection of user volumes, and issues storage commands having user-volume addresses.

Storage agent 40 translates between the different address spaces using a RAID table 56 and a volume map 60. RAID table 56 holds the translation between LV addresses (RBAs) and physical addresses, and volume map 60 holds the translation between user-volume addresses (UBAs) and LV addresses (RBAs). Nevertheless, in the context of the present patent application and in the claims, RBAs are also sometimes referred to as physical addresses.

Typically, any server 24 may attach to any user volume. A given user volume may have multiple servers attached thereto. In some embodiments, storage controllers 36 define and maintain a global volume map that specifies all user volumes in system 20. Volume map in each storage agent 40 comprises a locally-cached copy of at least part of the global volume map. In agent 40 of a given server, volume map 60 holds at least the mapping of the user volumes to which this server is attached.

Volume Management Data Structures

In some embodiments, volume map 60 is implemented in system 20 using a reference-counted Copy-On-Write B-tree, referred to herein as a volume tree. The volume tree supports mechanisms such as thin provisioning, clones and snapshots. These mechanisms and the data structures that support them are explained in detail below.

Thin provisioning means that physical memory (in the RBA address space) is allocated to a user volume only for addresses (in the UBA address space) that are actually accessed. A reference count assigned to certain data or data structure refers to the number of entities (e.g., user volumes) accessing it. A clone or snapshot is a copy of a user volume that is created at a certain point in time. In the context of the present patent application and in the claims, the term "clone" refers to both writable and non-writable copies of user volumes. The disclosed techniques are applicable in a similar manner to any suitable types of copies of user volumes, including writable and non-writable clones and snapshots.

Repeated cloning operations create a family of user volumes that are referred to herein as a volume dynasty, which can be represented by a volume dynasty tree. The volumes in a given dynasty typically share a large number of common volume-tree nodes and extents, at least initially.

Figure 3:
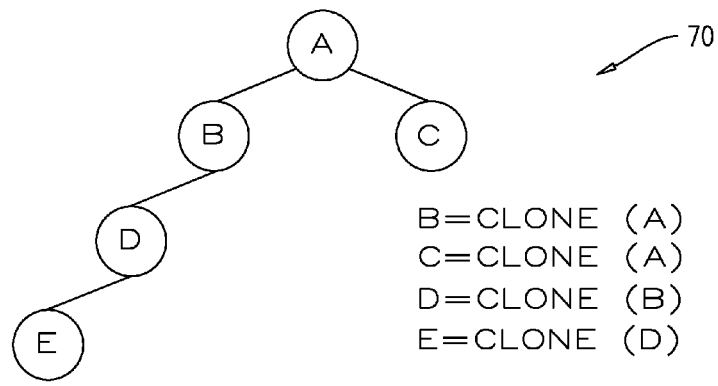
FIG. 3 is a diagram that schematically illustrates a volume dynasty tree, in accordance with an embodiment of the present invention.

FIG. 3 is a diagram that schematically illustrates a volume dynasty tree 70 managed by storage controllers 36, in accordance with an embodiment of the present invention. The parent-child hierarchy in tree 70 is created by cloning operations, i.e., a child node is a clone of its parent. In the present example, volume B is a clone of volume A, volume C is also a clone of volume A, volume D is a clone of volume B, and volume E is a clone of volume D.

Each node in dynasty tree 70 (representing a respective volume) typically comprises the following structure:

```
struct volume_dynasty_entry {
    vol_id_t volume_id; // Unique ID of the volume, by
which the root can be found.
    u64 backref_cnt; // Number of back-references
pointing to this node.
    u32 flags; // e.g., deleted
} __atribute__((packed));
```

Figure 4:
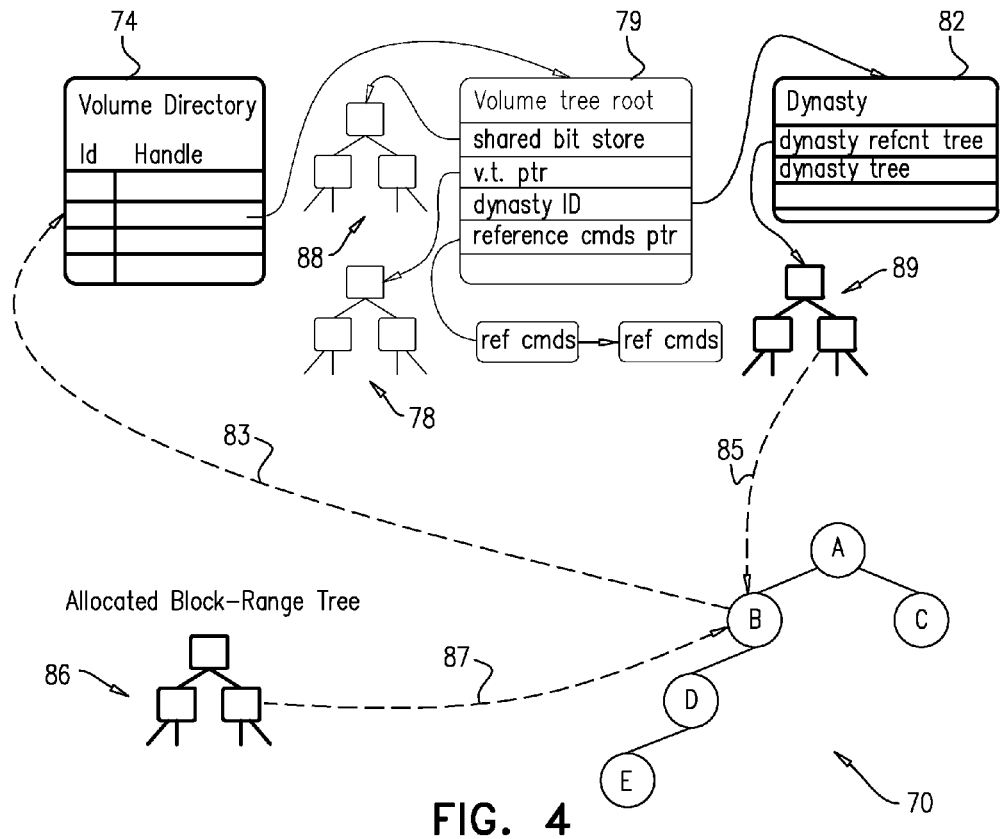
FIG. 4 is a diagram that schematically illustrates data structures used in a distributed data storage scheme, in accordance with an embodiment of the present invention.

FIG. 4 is a diagram that schematically illustrates the main data structures used by storage controllers 36 for representation and management of volumes in system 20, in accordance with an embodiment of the present invention. Elements shown in thin lines are shared between storage controllers 36 and agents 40 of servers 24, e.g., using RDMA offload. Solid arrows between data structures represent forward references (from UBA space to RBA space), whereas dashed arrows between data structures represent back-references (from RBA space back to UBA space).

In some embodiments, the data structures in system 20 comprise at least a volume directory 74, zero or more dynasty data structures 82 (one per dynasty, corresponding to a respective dynasty volume tree 70), one or more volume trees 78 (one per user volume) having respective roots 79, and an allocated block-range tree 86.

In an embodiment, each volume tree root 79 points to a shared bit store 88, a data structure that indicates which of the nodes and extents of the volume tree is shared with other volume trees (e.g., clones). Volume tree 78 and shared bit store 88 are shared between controllers 36 and servers 24. A local cache of these data structures may optionally be stored on the servers.

Each volume tree 78 is typically stored redundantly in the Random Access Memory (RAM) of both storage controllers C1 and C2. In the present example, for the sake of clarity, it is assumed that one of the storage controllers receives all requests for a given volume, and transactionally replicates the state to its peer controller.

Volume tree 78 is implemented using a Copy-On-Write B-tree. Cloning operations using such a representation is described further below. The leaves of volume tree 78 represent extents (i.e., contiguous block allocations in the UBA space). (In the context of the present patent application and in the claims, the term "node" refers to the elements in all tree levels, including leaves, middle nodes and root.)

Nodes in volume tree 78 are lazily reference-counted to allow for node-sharing between several volume trees, e.g., for implementing volume cloning and releasing unused nodes. The reference counters themselves are not necessarily stored in volume tree 78 itself. In the present example the reference counters are stored in a separate data structure referred to as a dynasty refcnt tree 89. A server 24 that maps a given user volume may optionally cache volume tree 78 of this volume, or parts thereof.

The main function of volume tree 78 is to enable an agent 40 in a server 24 to translate a UBA into the corresponding RBA, in order to access data stored in the volume. In the present example, volume tree 78 is keyed by a volume_tree_key structure, which specifies allocated extents in the user address space (UBA):

```
struct volume_tree_key {
    u64 user_block_address;
    u32 size_in_blocks;
} __atribute__((packed));
```

A UBA is matched within a specific volume_tree_key if UBA ϵ[key.user_block_address, key.user_block_address+key.size_in_blocks). For each key, volume tree 78 comprises a 64-bit RBA.

In some embodiments, shared bit store 88 comprises a respective "shared bit" flag for each node of volume tree 78, including inner nodes and extents (leaves). This flag is set to "1" for inner nodes whose reference count is two or higher in volume dynasty refcnt tree 89. The flag is also set to "1" for leaves (extents) whose reference count is two or higher in volume allocated block-range tree 86. Using this implementation, shared bit store 88 provides servers 24 with sufficient information for deciding whether a node or an extent in volume tree 78 needs to be copied on write. When sharing the shared bit store among controllers 36 and servers 24, there is no need to share volume dynasty refcnt tree 89 and allocated block-range tree 86. In various embodiments, shared bit store 88 may be implemented as a tree, as a flat table indexed by node_id, or in any other suitable manner.

Volume directory 74 is typically implemented as a flat key-value store that maps volume_id's to volume tree roots 79. Such a data structure may be implemented, for example, as a flat array of 64-bit pointers to volume tree roots 79, with the array index serving as a volume_id. Servers 24 can modify entries in volume directory 74, for example, using atomic RDMA operations, along with any other persistent volume-specific information.

In the embodiment of FIG. 1, allocated block-range tree 86 specifies the block ranges (in RBA space) that were allocated to user volumes. An allocated_block structure specifies a contiguous block range in the RBA space, and serves as a key for accessing allocated block-range tree 86. The allocated_block_range structure is the value stored in the tree. Thus, accessing tree 86 comprises querying the tree with an RBA range (serving as key), and obtaining the allocated_block_range structure in return.

```
struct allocated_block_range {
    u64 raid_block_address;
    u32 size_in_blocks;
    u32 refcount;
} __atribute__((packed));
```

Each block (in RBA space) in tree 86 comprises a reference count specifying the number of user extents (in UBA space) referencing it. Cloning a volume does not increase the reference count of its extents due to lazy refcnt management. However, when a leaf in volume tree 78 is copied-on-write such that two leaves point to the same RAID block-ranges, the reference count of those RAID block-ranges is incremented.

Note that a user volume may refer to only a portion of an allocated block-range, and not to the entire block-range. Consider, for example, a scenario in which a volume is cloned and the parent volume receives a 4 KB write request in the middle of a 1 MB allocated block-range. To accommodate this write request, the user 1 MB extent is split into two, and a new 4 KB extent is allocated and placed in the middle. The 1 MB block-range is now referenced by two user extents smaller than 1 MB, and by the third original user extent. Thus, the reference count of this 1 MB block-range is now three.

In an embodiment, allocated block-range tree 86 also assists in optimizing RAID rebuilds (e.g., following storage device failure), by providing an interface for querying which areas of the RAID address space are in fact in use.

In some embodiments, controllers 36 define allocated-block-range back-references 87, which point from block ranges in tree 86 to volume dynasty entries in dynasty tree 70. A given back-reference 87 enable the storage controllers to find all volume trees 78 that reference this allocated-block-range.

When a back-reference 87 is created, the dynasty entry backref_cnt member of the relevant volume is incremented. When a back-reference 87 is deleted, the backref_cnt member is decremented. A volume delete operation on a volume that has a positive backref_cnt in its volume_dynasty_entry is marked as deleted (e.g., using flags), but not removed from dynasty tree 70. A volume delete operation on a volume that has a zero backref_cnt in its volume_dynasty_entry, or a volume that is marked as deleted and has backref_cnt decremented to zero, is removed from the dynasty tree. All children of such a deleted node are migrated to its parent. The root of dynasty tree 70 (the entry representing the original volume from which the other volumes were cloned) is only deleted when its backref_cnt reaches zero and it has no children, thus deleting the entire dynasty.

In an alternative embodiment, the volume dynasty may be represented using an efficient data structure, such as a Red-Black (RB) tree, enabling faster lookup at run time.

Volume dynasty refcnt tree 89 stores the reference counts of all non-leaf (non-extent) nodes in all volume trees 78 of the volume dynasty, along with their respective back-references 85. Tree 89 is keyed by node_id values that uniquely identify volume-tree nodes in system 20.

In an embodiment, nodes with a reference count of one are not added to tree 89, since most nodes in the volume trees of the system are expected to have a reference count of one. Nodes with zero reference count are not added to refcnt tree 89 either, as they should be freed once their reference count reaches zero. Incrementing a reference count from one to two causes the storage controller to add both the source and target volumes as back-references 85.

Back-References Between Data Structures

In some embodiments, back-references 87 are used by controllers 36 for fast lookup of user extents from RAID block-ranges. Such fast lookup is needed, for example, for operations involving moving data, such as phasing-out of a RAID address range or defragmentation. Each back-reference 87 typically points to a user extent in a volume tree. To enable moving data from one RAID block-range to another, the back-reference should enable the storage controller to modify all volume trees 78 referencing a given RAID block-range. Upon creation, each back-reference 87 typically comprises a pointer to the entry of the appropriate volume in volume dynasty tree 70, and the user address (UBA) of the extent. Back-references 87 are typically stored in allocated block-range tree 86.

Another type of back-references, marked 85 in FIG. 4, are used for fast lookup of volume trees 78 from volume-tree nodes (which may be referenced by multiple trees in the same volume dynasty). Such fast lookup is used, for example, for paging-out a node shared among multiple volumes to non-volatile memory. Volume dynasty refcnt tree 89 typically maintains back-references 85 for each node having a reference count of two or more. Upon creation, each back-reference 85 typically comprises a pointer to the entry of the appropriate volume in volume dynasty tree 70, and the lowest key in the node.

Server-Side Metadata Usage and Manipulation

In the disclosed embodiments, agents 40 in servers 24 carry out I/O operations without triggering or running code on the storage controller CPUs. For this purpose, agents 40 are capable of reading and manipulating the shared metadata and data structures located on the controllers described herein. For example, a given agent 40 is able to translate UBAs into RBAs using volume trees 78, to allocate blocks and add new extents to thinly-provisioned volumes, and to modify volume trees 78 (e.g., to replace extents) when performing copy-on-write for cloned or de-duplicated extents. All these operations are performed by agents 40 in servers 24 autonomously, without triggering the storage controller CPUs.

Typically, for each mapped user volume, agent 40 has RDMA access to the following data structures and generation numbers:

- Volume tree handle structure in volume directory 74, typically using 64-bit RDMA read/atomic test and set access.
- Volume tree 78, typically using RDMA read access.
- Pre-allocated (on both storage controllers 36, per server 24) volume-tree nodes, usually using RDMA read/write access.

In addition, each agent 40 typically has a pool of pre-allocated block ranges, so that the agent is able to autonomously allocate new extents to user volumes. Any suitable pre-allocation policy can be used for this purpose. It is typically the responsibility of agent 40 to maintain a sufficient number of block ranges and volume-tree nodes by receiving prior allocations from the controllers in a non-I/O context.

UBA-to-RBA Translation

Volume tree 78, or at least a portion thereof, is typically cached locally on each server 24 mapping the respective user volume. To perform UBA-to-RBA translation, e.g., as part of a read or write operation, agent 40 typically looks-up the cached volume tree. If a certain portion of the volume tree is needed for the lookup but is not cached locally at the server, agent 40 typically retrieves the missing portion from storage controller 36.

The retrieval of a missing volume-tree portion typically begins by reading the volume-tree handle structure using RDMA, and verifying that the correct tree generation is used (i.e., that the structure is equal to the locally cached tree). If not, the locally-cached tree is to be updated, possibly optimized using generation numbers/digests in a parallel (smaller) data structure.

In an embodiment, agent 40 reduces latency by verifying the generation number in parallel with the I/O operation itself. Such parallelization is possible when the I/O operation is non-damaging, e.g., comprises only read requests, or performed while transmitting the data to be written but before actually writing it and redoing the operation in case of inconsistency.

Volume-Tree Modification

In some cases, a write operation by a server to a user volume requires modifying volume tree 78, e.g., when a new block needs to be allocated due to thin-provisioning or copy-on-write. In an embodiment, agent 40 of the server first updates the locally-cached copy of the volume tree by applying copy-on-write to the affected nodes, including the root. B-tree nodes are proactively split or merged during addition or removal.

Agent 40 then writes the new nodes using RDMA to pre-allocated nodes on both storage controllers 36. The agent then issues an atomic test-and-set RDMA command, so as to commit the updated volume tree by atomically replacing the volume tree handle structure (on both controllers, one by one, starting at the master controller).

If the test-and-set command fails, the locally-cached copy of the volume tree is updated and the operation is retried. Such contention is typically rare. This sort of atomic test-and-set of the root can also be used in a centralized manner to increase B-tree operation parallelism. The protocol can be network optimized by using RDMA commands such as accelerated memcpy to copy an old node to a new location on the controller without transferring the entire 4 KB of data over the network.

A possible "write hole" problem could arise if the server crashes after performing the test-and-set operation on the first controller, but before updating the secondary controller. In an example embodiment that solves this issue, each controller 36 periodically scrubs the volume tree handles of all volumes it masters, by comparing them to the corresponding handles on the secondary controller. In case of a mismatch, the comparison may be retried several times, and if the mismatch is persistent, it is fixed. If a server detects a mismatch before it is resolved by the controllers, the server may request the controller to fix the discrepancy in-band. Such scrubbing is typically triggered immediately for all volumes mapped (with write access) by a server that is detected as crashed.

Reference Counting and Copy-on-Write

Modifying the volume tree may involve updating reference counters and/or back-references of nodes and/or extents. As the data structures holding this information are centralized, controllers 36 should be involved. In some embodiments, in order to keep the controller CPUs out of this process, the server writes (using RDMA) a sequential list of commands requesting controllers 36 to lazily perform these operations on its behalf. In this context, "lazily" means that the operations will be performed by the controllers outside the I/O context.

In the example of FIG. 4, a pointer (denoted "reference cmds ptr") to a linked list of such sets of commands is stored in volume tree root 79. A server may add a pointer to its commands to root 79 before committing it by the atomic test-and-set RDMA operation, potentially chaining the command sets of previous servers.

The master controller for each volume periodically checks each root 79 and performs the reference count commands. Note that volume-tree nodes may be copied, split and/or merged, and therefore the command set should allow for such manipulation of the data structures by controllers 36. Source and target volume_ids, and the lowest UBA in a node, can be used by controllers 36 to establish back-references to nodes in volume dynasty refcnt tree 89.

In an example embodiment, a non-exhaustive list of commands may comprise:
inc_node_ref_cnt(node_id,src_volume_id,target_volume_id, lowest_uba_in_node)
dec_node_ref_cnt(node_id,volume_id, lowest_uba_in_node)
inc_block_range_ref_cnt(rba,volume_id,uba)
dec_block_range_ref_cnt(rba,volume_id,uba)
add_new_node(node_id,volume_id,lowest_uba_in_node)
add_new_block_range(rba,volume_id,uba)

To reduce latency, the metadata operations performed by servers 24 may be performed in parallel with transferring the actual write data to the controller and writing to non-volatile memory.

Typically, a node or extent of the volume tree should be copied-on-write if its shared bit in shared bit store 88 is set. As will be explained below, the shared bit is typically set by controller 36 during cloning and de-duplication operations. The shared bit may be reset when controller processes the reference count command set lists.

The main purpose of the shared bit is to ensure that data is copied-on-write when appropriate. However, since reference counts and the shared bit are not updated at I/O time, there may be rare occasions where nodes are copied-on-write needlessly.

For example, let A be a volume tree and B=clone(A). Consider a write operation that arrives in one of the extents of A. As a result, a new extent is allocated for the write, and the relevant nodes/extents are copied-on-write and modified. At this point, a second write arrives to the same location, but this time to volume B. Since this location is no longer shared, the second write may be simply performed in-place. However, if the reference commands were not yet processed by the controller, an unneeded extent will be allocated and the relevant nodes copied-on-write needlessly. The unused nodes and extents may be released once the controller processes the relevant decrement reference commands, which will reduce the reference count to zero.

Volume Tree Allocation, Indexing and Paging

As explained above, volume tree 78 of a user volume is read and written collaboratively by storage controllers 36 and the various agents 40 in servers 24 that map that volume. While a volume tree may comprise nodes shared by multiple volumes, e.g., after a volume is cloned, a server usually caches only the nodes accessible from the roots of the volumes mapped by the server.

In some embodiments, each agent 40 is able to read (using RDMA, from controller 36) volume-tree nodes of volumes it maps. Agent 40 is able to write (using RDMA) nodes that have been pre-allocated to the server. Volume-tree nodes are typically pre-allocated out-of-band to servers 24, and mapped as writable to the relevant servers. It is typically the responsibility of each server 24 to ensure it has a sufficiently large pool of pre-allocated volume-tree nodes.

In some embodiments, controllers 36 are configured to page-out volume-tree nodes to underlying shared persistent storage (e.g., Flash storage). This paging-out capability enables volume map 60 to exceed the size of the controllers' power-failure-protected RAM. In an embodiment, the most significant bit of the index may be used as the present bit. Paged-out volume-tree nodes may be stored in a dedicated thinly-provisioned swap volume on the system (e.g., one swap volume per pair of storage controllers). This dedicated volume is mapped as read/write on controllers 36, and read-only on servers 24. The swap volume tree may be pinned to power-failure-protected RAM.

In an embodiment, to page-out a volume-tree node, controller 36 first writes the node content to the swap volume. In parallel, the controller looks-up all volume trees 78 that comprise the node to be swapped, e.g., by looking-up volume dynasty refcnt tree 89. Controller 36 then modifies the given volume-tree paths to point to the paged-out node (present bit cleared). The virtual page used by the node should then be unregistered from RDMA, such that a server will not be able to erroneously read it, and the underlying physical page may then be reused for other purposes. The scheme above allows volume-tree nodes to be paged-out, while keeping the controller CPUs uninvolved the I/O path. A server that needs to read a volume-tree node that has been paged out can read the node directly from the swap volume. Such a server may send hints to the controller to page-in the given node.

Additionally or alternatively, controllers 36 may be configured to page-out any other suitable data structure.

Block Storage Operations

This section describes several block storage operations that are performed by agents 40 in servers 24 and/or by storage controllers 36 using the above-described data structures.

Creation or Deletion of a Volume

Creation or deletion of a user volume typically comprises a non-I/O-path operation performed by storage controller 36. In some embodiments, a storage controller creates a new volume tree 78 by allocating and initializing an empty volume tree (a single page), adding the new tree to volume directory 74, and creating a new volume dynasty 70. The relevant metadata operations are transactionally mirrored by the other storage controller.

A storage controller may delete a volume by recursively traversing the volume tree. For each traversed node, the controller decrements the reference count (in volume dynasty refcnt tree 89). If the resulting reference count is non-zero, the controller stops downward traversal and returns up the tree. If the reference count is zero, the controller continues downward traversal in the tree, freeing nodes on the way back up the tree.

Cloning a Volume

Cloning of a user volume typically comprises a non-I/O-path operation performed by the storage controller. As explained above, user volumes are represented by B-trees that allow for quick creation of space-efficient clones that share data structures and extents. Cloned volumes have similar properties to regular volumes, e.g., allowing them to be cloned, as well.

Figure 5:
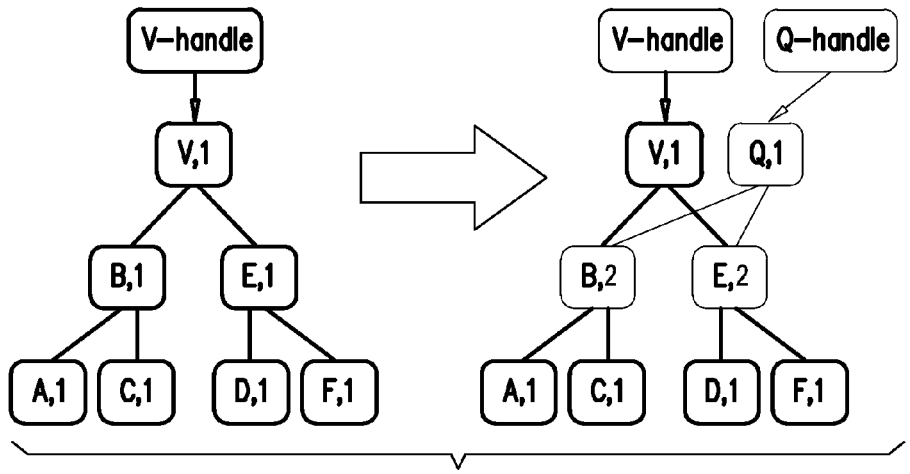
FIG. 5 is a diagram that schematically illustrates a volume cloning process, in accordance with an embodiment of the present invention.

FIG. 5 is a diagram that schematically illustrates a volume cloning process, carried out by storage controller 36, in accordance with an embodiment of the present invention. The left-hand-side of the figure shows the volume tree of a user volume denoted V, before cloning. The right-hand-side of the figure shows the volume tree after volume V is cloned to produce a new volume denoted Q.

In the present example, nodes A, C, D and F correspond to allocated extents. Each node in the tree is marked with a respective index letter and a respective node-specific reference count. The reference counts are stored in the volume reference count tree 89.

When volume V is cloned, controller 36 shadows root 79 of volume tree 78 of volume V into a newly-allocated tree-root page Q. The controller lazily increments the reference counts of (only) the direct children of the tree root. The new volume Q is then added to volume directory 74, and to dynasty tree 70 as a child of volume V.

In an embodiment, controller 36 manages the exact point in time at which a clone is performed with respect to I/O commands. Successful completion of a clone command indicates that the clone is complete. The cloned volume may comprise some or all commands queued before the completion of the clone command. However, the cloned volume (Q) should be completely separate with respect to writes issued to the original volume (V) by servers after successful completion of the clone command.

As explained above, controller 36 sets the shared bits of volume-tree nodes during a clone operation, after lazily incrementing the reference counts of the child nodes of volume V. The shared bit change is followed by invalidation the volume-tree handle, which is checked by all servers while handling write commands. This mechanism guarantees that such servers will notice the clone operation and perform a copy-on-write of the relevant extents and tree nodes. In an embodiment, since the shared bits are not relevant for read operations, the volume tree handle may be updated such that reads will continue to flow while the tree is updated for writes.

In the example of FIG. 5, controller 36 increments the reference counts of nodes B and E, while also setting the shared bits of these nodes, and updating the volume-tree handle of volume V to force servers to update their locally-cached trees.

Extent Provisioning

Provisioning of extents typically comprises an I/O-path operation, which may be performed by either servers or by controllers 36. A new extent is typically inserted into a volume tree 78 when a server 24 writes to a UBA to which an RBA was not yet allocated. For simplicity of explanation, we first describe insertion of an extent into a volume tree whose reference counts are all one. The case of a cloned volume tree, having reference counts greater than one, is addressed further below.

In an embodiment, a server 24 traverses its locally-cached volume tree, attempting to find the leaf node in which an extent with the requested UBA range should be located. If such an extent is not found, the server allocates a new block range from its pre-allocated pool of block ranges. Due to fragmentation, it is possible that more than one block range will be needed to cover the desired UBA range. The one or more newly-allocated block ranges are then added to the volume tree as extents (leaves—one per allocated contiguous block range). While adding the extents, nodes are proactively split, merged and shadowed on the way down the tree. Once the operation is complete, the updated volume tree can be committed to both storage controllers.

Consider a scenario in which two or more servers 24 race to write to unallocated UBA ranges that overlap one another. This scenario may occur, for example, when two servers write to overlapping UBA ranges. As another example, when a large contiguous block is allocated, the servers may write to UBA ranges that do not overlap, but the two newly-created extents do collide with each other (e.g., two adjacent 4 KB UBAs with an 8 KB RBA allocation). In such a case, one of the servers will typically succeed in committing the volume tree and the other will fail and redo the operation.

Clones & Insertion of New Extents

Insertion of a new extent into a cloned volume tree typically comprises an I/O-path operation, which may be performed by servers 24 or by controllers 36. Such extent insertion is performed in response to a write to an extent that is shared between two or more volumes (i.e., an extent having a reference count greater than one).

Inserting an extent into a volume tree triggers shadowing on the path from the tree root to the relevant leaf. For each shadowed node having a reference count greater than one, the reference count of the source node is decremented and the new shadowed node is assigned a reference count of one. The reference counts of the direct children of the source node are incremented by one. For nodes having a reference count of one, the mechanism of the previous section is followed.

Figure 6:
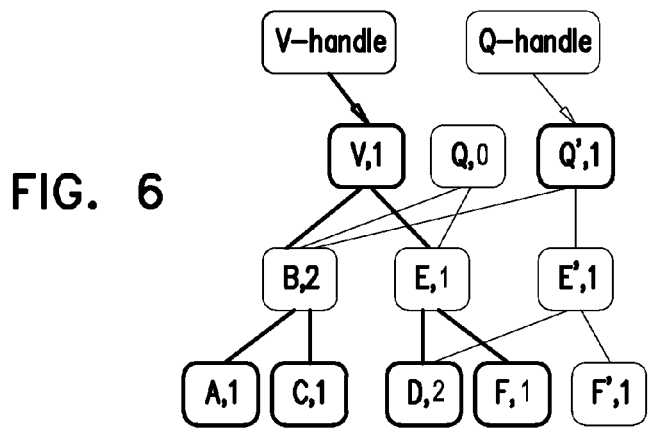
FIG. 6 is a diagram that schematically illustrates a process of adding an extent to a volume, in accordance with an embodiment of the present invention.

FIG. 6 is a diagram that schematically illustrates a process of adding an extent to a cloned volume tree, in accordance with an embodiment of the present invention. The example of FIG. 6 begins with the cloned volume tree on the right-hand-side of FIG. 5 above.

At a certain point in time, a server 24 writes to volume Q, to an extent stored in node F. The server follows by copying-on-write the entire path from the tree root to node F, i.e., nodes Q, E and F. This copy-on-write operation adds new nodes denoted Q', E', F'. After the copy-on-write operation, nodes E and F are no longer shared, and therefore their reference counts are decremented. New nodes Q', E', F' are transferred to pre-allocated nodes on both controllers, e.g., using RDMA. The following reference modification commands are also transferred, e.g., using RDMA (possibly chained to a previous list if one exists):

add_new_node(Q')
    add_new_node(E')
    add_new_node(F')
    dec_node_ref_cnt(Q)
    dec_node_ref_cnt(E)
    inc_node_ref_cnt(D)
    dec_node_ref_cnt(F)
    inc_block_range_ref_cnt(all block ranges shared between F and F')
    add_new_block_range(all new block ranges in F')

The mechanism above avoids a potential problem of corrupting a volume by writes to the shared extents in the other. Before the controller parses the reference modification commands and updates the node/extent shared bits, writes to extents shared between F and F' might corrupt the other volume. This cannot happen, however, since before the controller parses the commands, F is still marked as shared and therefore all writes to extents of F will be (perhaps redundantly) copied-on-write. Once the controller parses and atomically commits the commands, the state becomes correct.

In an optional embodiment, back-references are verified for consistency, as part of decreasing the reference counts. A scrub process may also be used to verify the consistency of reference counts and back-references by periodically scanning the volume trees.

Removing an Extent

Removal of an extent typically comprises a non-I/O-path operation, which may be performed by servers 24 or by the controllers 36. An extent may be removed from a thinly-provisioned volume, for example, because of inband SCSI commands (e.g., unmap, trim, extended copy, write same or write using token). An extent may also be removed, modified or split out-of-band due to data reduction (e.g., de-duplication or compression).

To remove an extent corresponding to specified UBAs, volume tree 78 is typically traversed downwards from the root, in an attempt to find the leaf corresponding to the UBAs. As described above, nodes are proactively merged on the way down. The extent removal operation, including reference counting, is handled similarly to the extent insertion operation described above.

Storage Data Movement Offload

In some embodiments, the data structures and cloning mechanisms described above can also be used for efficient implementation of data movement operations in system 20. Data movement operations may comprise, for example, VMware vSphere Storage API Array Integration (VAAI) Extended Copy (XCOPY) and write-same commands, Offloaded Data Transfers (ODX), or any other suitable commands.

An XCOPY command, in which all addresses fall within the same mapped volume, can be handled by the issuing server 24 as a single step. The server may modify volume tree 78 such that the target addresses map the same extents as the source, releasing overridden extents in the process. The relevant extents are typically marked as shared, and the relevant reference commands are queued. The XCOPY command may be completed once the updated volume tree is successfully committed to the controller.

An XCOPY command that mixes multiple volumes mapped on the server may be split into two stages performed by the server. In the first stage, all source extents in the source volumes are marked as shared and the relevant reference commands are queued. The source volumes are then committed to storage controller 36. In the second stage, the target volume trees are modified such that the targets map the same extents as the now marked and committed as shared sources.

When using the above mechanism, a write-hole flaw may occur if a server crashes after committing the source volume trees (or part thereof) but before committing the target volume trees. This flaw may be resolved by having the server log its actions onto the storage controllers (e.g., using RDMA), and having the storage controllers perform a cleanup operation in case the server fails without committing the target volumes.

As another example, write-same commands may be handled by the server. In case unmapping is requested (or zeroes are written), extents are removed from the volume map. In case data is written, a single LBA extent is written, with the other LBAs pointing to this shared extent. The above operation should support both the unmap and anchor bits of the write same command.

As yet another example, Offloaded Data Transfers (ODX) can be implemented. ODX uses a token to save the state of data from given LBA ranges. The "populate token" SCSI command is used to create the token, which may then be queried by the "receive ROD token information" command, and used by the "write using token" command to copy data. Since these transactions may span multiple servers, with a token created on one server used by another, the token and its related metadata should be centralized.

Figure 7:
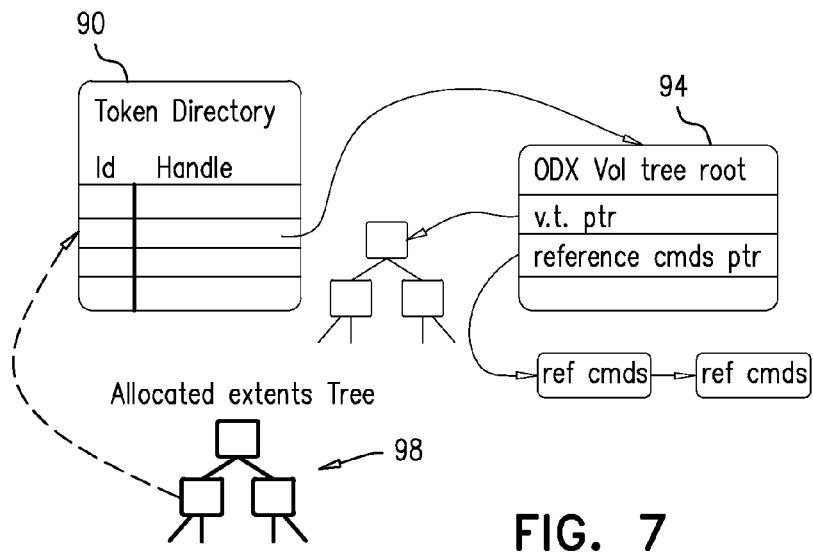
FIG. 7 is a diagram that schematically illustrates data structures used for implementing Offloaded Data Transfers (ODX), in accordance with an embodiment of the present invention.

FIG. 7 is a diagram that schematically illustrates data structures used for implementing ODX, in accordance with an embodiment of the present invention. In this embodiment, an ODX token directory 90 is used for storing tokens. Token directory 90 may be implemented, for example, as a flat table similar to volume directory 74.

The "populate token" command in this implementation marks all source extents as shared and commits the relevant volumes (similarly to XCOPY). The command then creates a new volume tree data structure 94 that maps these extents. An entry is added into an empty slot in the ODX token directory (e.g., using an atomic RDMA test-and-set command) referencing this newly-created volume tree. Reference commands for the extents are added to the root of the volume tree, to be processed by controller 36. The back references from an allocated extents tree 98 hold the token ID and the LBA.

ODX token directory 90, or parts thereof, may be replicated to other servers on demand, and thus can be used to implement the "receive ROD token information" and "write using token" commands without involving the controller CPU. Server crashes may be handled similarly to the volume tree and the XCOPY command.

Although the embodiments described herein mainly address offloading of storage controller CPUs, the methods and systems described herein can also be used in other applications, such as in other offloading applications.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method for data storage, comprising:
   in a system that comprises one or more storage controllers, multiple servers and multiple storage devices that communicate over a network, running user applications on the servers;
   storing, in a memory of the one or more storage controllers, a data structure, which (i) represents thinly-provisioned user volumes used by the servers in storing data on the storage devices, and (ii) specifies for the user volumes a logical-to-physical mapping between logical addresses and physical addresses of the storage devices;
   generating, in a given server that is configured to run one or more of the user applications, storage commands that access one or more of the user volumes, by performing in the given server:
   (i) retrieving at least a part of the logical-to-physical mapping from the memory of the one or more storage controllers to the given server, using direct remote access to the memory of the one or more storage controllers and without executing code on the one or more storage controllers;
   (ii) translating the logical addresses accessed by the storage commands into the respective physical addresses, using the retrieved at least part of the logical-to-physical mapping; and
   (iii) generating the storage commands that specify the translated physical addresses; and
   sending the storage commands, which specify the physical addresses, from the given server that is configured to run the one or more of the user applications directly to one or more of the storage devices, without executing code on the one or more storage controllers.

2. The method according to claim 1, wherein the data structure comprises one or more tree structures that map the logical addresses in the user volumes onto the physical addresses in the storage devices.

3. The method according to claim 2, wherein storing the data structure further comprises indicating in the data structure which nodes of the one or more tree structures are referenced by more than a single user volume.

4. The method according to claim 2, wherein storing the data structure comprises defining back-references that point from nodes of the one or more tree structures to the user volumes that access the nodes.

5. The method according to claim 1, wherein generating the storage commands comprises detecting, using the data structure, that a given user volume has a clone, and performing a copy-on-write operation when writing to the given user volume.

6. The method according to claim 1, wherein storing the data structure comprises defining in the shared data structure back-references that map the physical addresses in the storage devices back to the logical addresses in the user volumes.

7. The method according to claim 1, wherein storing the data structure comprises updating the data structure in response to creation of a clone of a user volume.

8. The method according to claim 1, wherein storing the data structure comprises updating the data structure in response to a write to a previously-unallocated address in a user volume.

9. The method according to claim 1, and comprising generating in at least one of the servers a list of commands for updating reference counts associated with one or more of the user volumes, and sending the list to at least one of the storage controllers for background execution.

10. The method according to claim 1, wherein storing the data structure comprises caching in the given server a local copy of at least a portion of the data structure, and wherein generating the storage commands comprises accessing a given user volume by the given server using the cached local copy.

11. The method according to claim 10, and comprising, upon accessing the local copy, verifying that the local copy is consistent with the data structure, and otherwise updating the local copy by accessing the data structure stored in the storage controllers.

12. The method according to claim 1, and comprising moving multiple blocks of data from first addresses to second addresses in the storage devices using the data structure.

13. The method according to claim 12, wherein moving the multiple blocks comprises performing an XCOPY or an Offloaded Data Transfers (ODX) operation.

14. The method according to claim 1, and comprising, on each of the storage devices, queuing the storage commands received directly from the servers in multiple server-specific queues, such that each server-specific queue queues the storage commands from a respective one of the servers.

15. A computing system, comprising:
multiple physical servers, which are configured to run user applications and to communicate with multiple storage devices over a network; and
one or more physical storage controllers, which have a memory and are configured to store in the memory a data structure that (i) represents thinly-provisioned user volumes used by the servers in storing data on the storage devices, and (ii) specifies for the user volumes a logical-to-physical mapping between logical addresses and physical addresses of the storage devices,
wherein a given physical server, which is configured to run one or more of the user applications, is further configured to generate storage commands that access one or more of the user volumes, by performing:
  (i) retrieving at least a part of the logical-to-physical mapping from the memory of the one or more storage controllers to the given server, using direct remote access to the memory of the one or more storage controllers and without executing code on the one or more storage controllers;
  (ii) translating the logical addresses accessed by the storage commands into the respective physical addresses, using the retrieved at least part of the logical-to-physical mapping; and
  (iii) generating the storage commands that specify the translated physical addresses,
and wherein the given server that is configured to run the one or more of the user applications is further configured to send the storage commands, which specify the physical addresses, directly from the given server to one or more of the storage devices, without executing code on the one or more storage controllers.

16. The system according to claim 15, wherein the data structure comprises one or more tree structures that map the logical addresses in the user volumes onto the physical addresses in the storage devices.

17. The system according to claim 16, wherein the data structure is further indicative of which nodes of the one or more tree structures are referenced by more than a single user volume.

18. The system according to claim 16, wherein the one or more storage controllers are configured to define back-references that point from nodes of the one or more tree structures to the user volumes that access the nodes.

19. The system according to claim 15, wherein the given physical server is configured to detect, using the data structure, that a given user volume has a clone, and to perform a copy-on-write operation when writing to the given user volume.

20. The system according to claim 15, wherein the one or more storage controllers are configured to define back-references that map the physical addresses in the storage devices back to the logical addresses in the user volumes.

21. The system according to claim 15, wherein the one or more storage controllers are configured to update the data structure in response to creation of a clone of a user volume.

22. The system according to claim 15, wherein the one or more storage controllers are configured to update the data structure in response to a write to a previously-unallocated address in a user volume.

23. The system according to claim 15, wherein the given physical server is configured to generate a list of commands for updating reference counts associated with one or more of the user volumes, and to send the list to at least one of the storage controllers for background execution.

24. The system according to claim 15, wherein the given physical server is configured to cache a local copy of at least a portion of the data structure, and to access a given user volume using the cached local copy.

25. The system according to claim 24, wherein, upon accessing the local copy, the given physical server is configured to verify that the local copy is consistent with the data structure, and otherwise to update the local copy by accessing the data structure stored in the storage controllers.

26. The system according to claim 15, wherein the given physical server is configured to move a bulk of data from first addresses to second addresses in the storage devices using the data structure.

27. The system according to claim 26, wherein the given physical server is configured to move the multiple blocks by performing an XCOPY or an Offloaded Data Transfers (ODX) operation.

28. A server, comprising:
a physical network interface for communicating over a communication network with multiple storage devices and with one or more storage controllers; and
a physical processor, which is configured to run one or more user applications, and to generate storage commands that access one or more thinly-provisioned user volumes on the storage devices, by:
  (i) retrieving to the server, using direct remote access to a memory of the one or more storage controllers and without executing code on the one or more storage controllers, at least a part of a logical-to-physical mapping between logical addresses and physical addresses of the storage devices, wherein the logical-to-physical mapping is stored in the memory in a data structure that (a) represents the thinly-provisioned user volumes, and (b) specifies the logical-to-physical mapping for the user volumes;
  (ii) translating the logical addresses accessed by the storage commands into the respective physical addresses, using the retrieved at least part of the logical-to-physical mapping; and (iii) generating the storage commands that specify the translated physical addresses, wherein the physical processor that is configured to run the one or more user applications is further configured to send the storage commands, which specify the physical addresses, directly to one or more of the storage devices without executing code on the one or more storage controllers.

* * * * *